Inventor
Chalmer B. Gough
Woodrow W. Gough

April 18, 1950     C. B. GOUGH ET AL     2,504,193
GREEN PEA HARVESTER AND SEPARATOR
Filed June 6, 1947     4 Sheets-Sheet 2
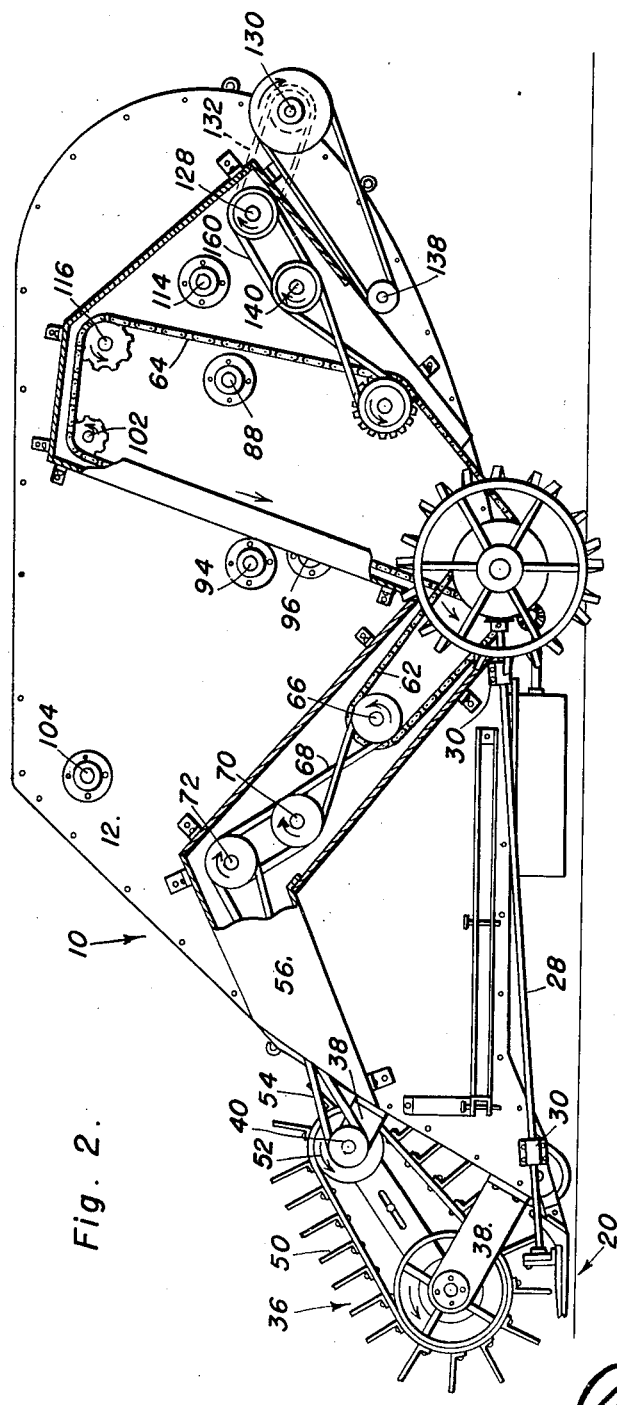
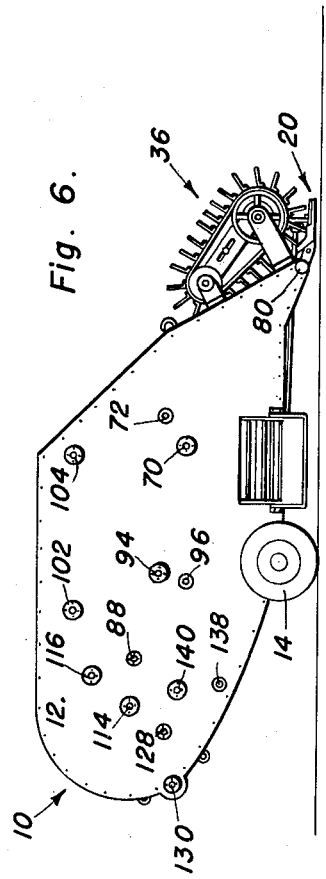
Fig. 2.
Fig. 6.
Inventor
Chalmer B. Gough
Woodrow W. Gough
By Clarence A. O'Brien
and Harvey B. Jacobson
Attorneys April 18, 1950 C. B. GOUGH ET AL 2,504,193
GREEN PEA HARVESTER AND SEPARATOR
Filed June 6, 1947 4 Sheets-Sheet 3

Inventor
Chalmer B. Gough
Woodrow W. Gough

Clarence A. O'Brien
and Harvey B. Jacobson
Attorneys

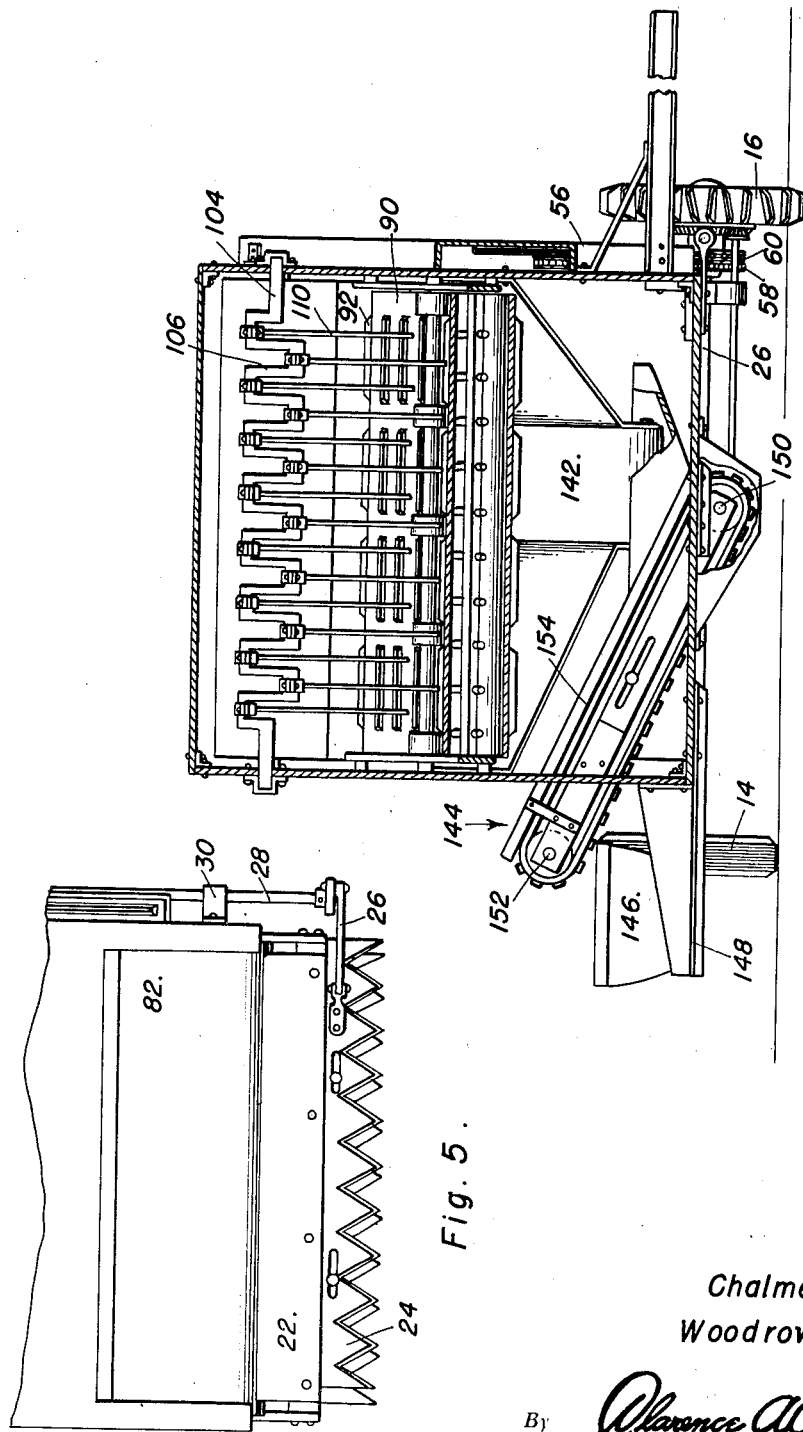

Patented Apr. 18, 1950

2,504,193

UNITED STATES PATENT OFFICE 2,504,193

GREEN PEA HARVESTER AND SEPARATOR

Chalmer B. Gough and Woodrow W. Gough, Ridgeville, Ind.

Application June 6, 1947, Serial No. 753,094

4 Claims. (Cl. 56—122)

This invention relates to novel and useful improvements in a green pea harvester and separator and more specifically pertains to a combined harvesting, separating and pea shelling device which may be attached to a tractor or the like.

The principal objects of this invention reside in providing a harvesting device of an improved construction for cutting pea vines, gathering the same, agitating the vines, shelling peas from the hulls thereof, discharging the separated waste products from the device and collecting and packing the shelled peas thereof.

Further important objects of the invention reside in providing an improved mechanism for gathering the pea vines after the same have been cut; in providing an improved sorting device in conjunction with highly efficient agitating means for feeding the vines in a thin and uniform mass to the shelling mechanism together with a highly efficient means for discharging the waste products from the device.

Still further objects of the invention consist in providing an apparatus in accordance with the foregoing objects, provided with a novel, efficient and dependable operating means for driving the same from the wheels of the attachment.

These, together with various ancillary objects of the invention which will later become apparent as the following description proceeds, are attained by this device, the preferred embodiment of which has been illustrated, by way of example only, in the accompanying drawings, wherein:

Figure 2 is a side elevational view from the other side of the device from that of Figure 1, certain parts being broken away to show the driving mechanism of the various components of the apparatus;

Figure 4 is a vertical transverse sectional view taken substantially upon the plane of the broken section line 4—4 of Figure 1;

Figure 5 is a fragmentary detailed sectional view, taken substantially on the plane of the broken section line 5—5 of Figure 1; and Figure 6 is a side elevational view of the device as shown in Figure 1.

Figure 1:
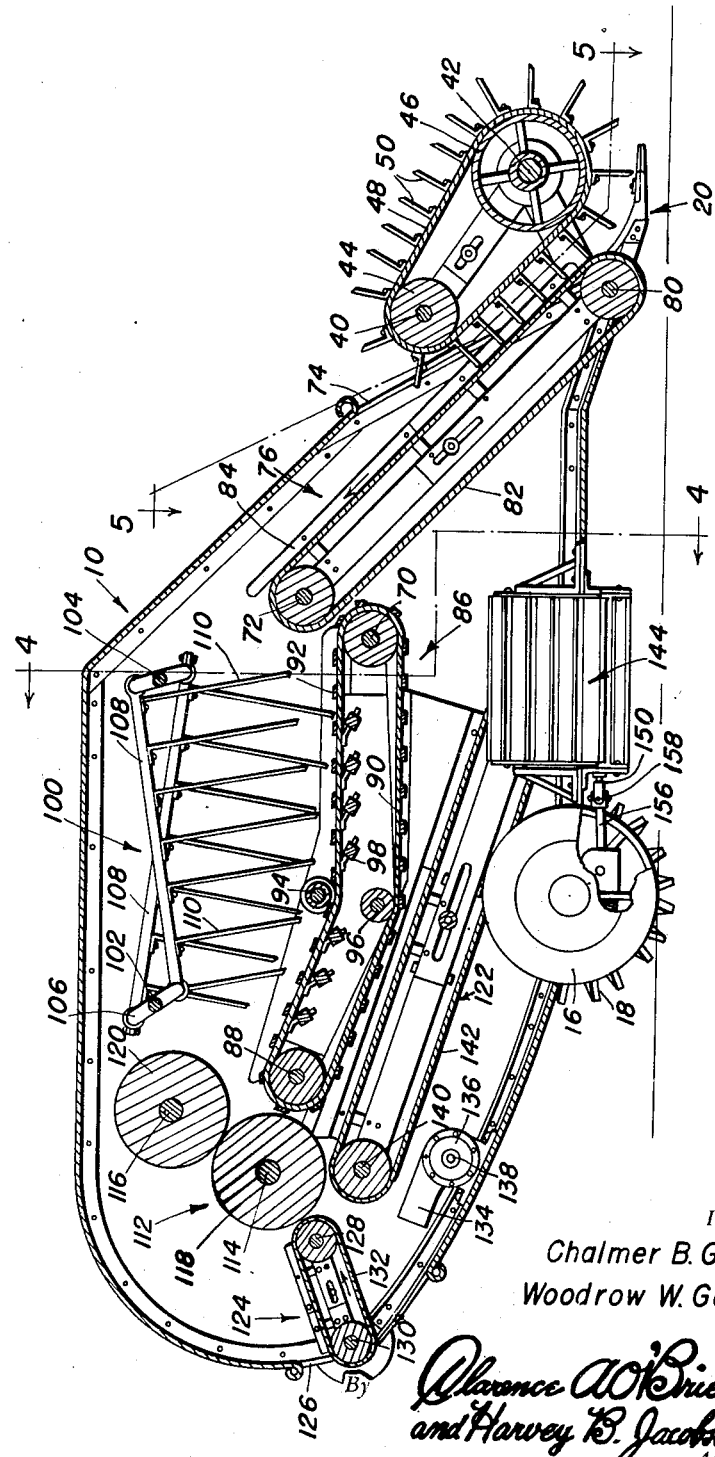
Figure 1 is a side elevational view of the harvester, parts being broken away and shown in section.
Figure 3:
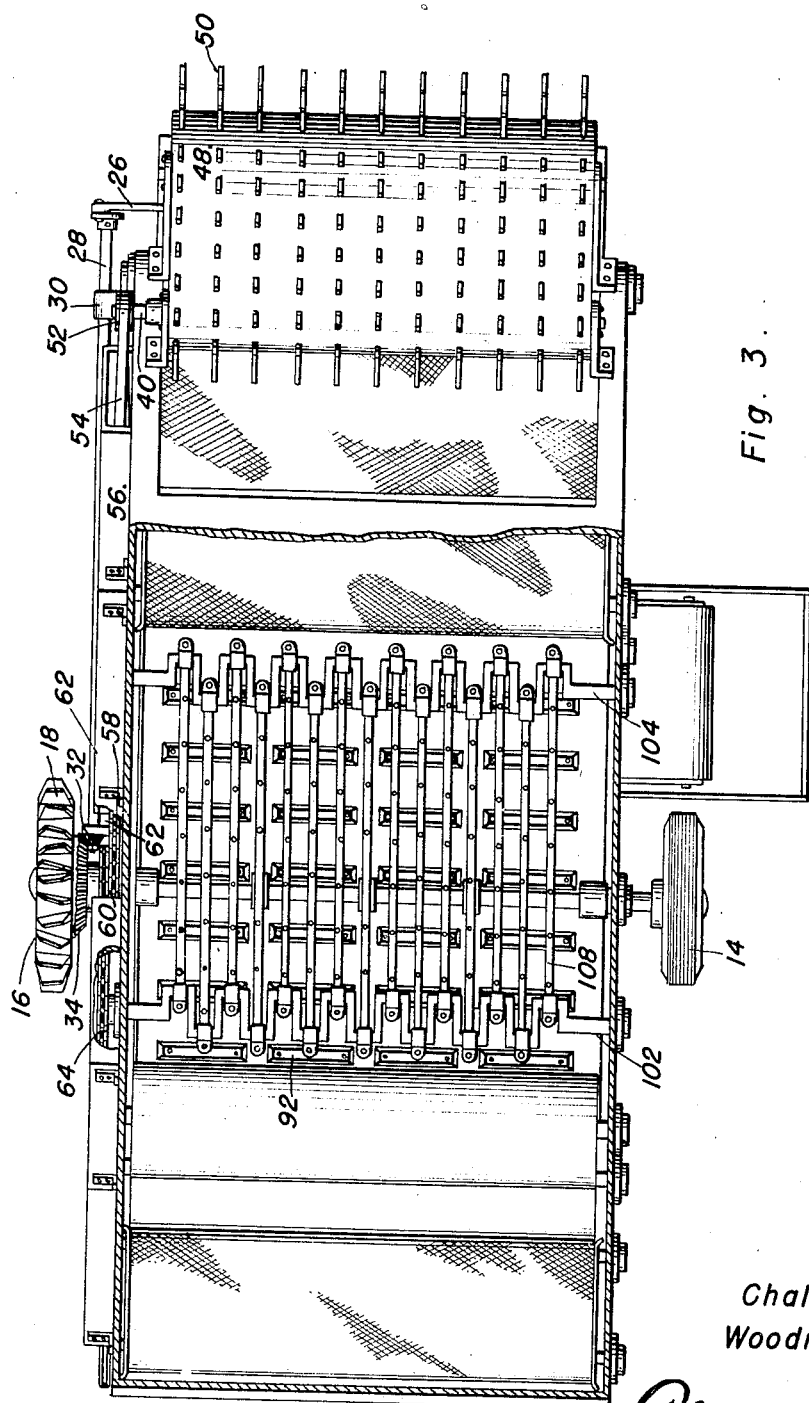
Figure 3 is a top plan view of the apparatus, part of the top being removed to show the interior construction of certain parts thereof.

Referring now more specifically to the annexed drawings, wherein like numerals designate similar parts throughout the various views, attention is directed first to Figures 1 and 6, wherein there is disclosed at 10 an attachment which is intended to be applied to and drawn by a tractor or the like, and which includes a suitable casing or housing 12 mounted upon a pair of supporting wheels 14 and 16 respectively. As shown in Figure 3, the wheel 16 is preferably provided with cleats or other traction promoting means 18, to enable this wheel to serve as a source of power for operating the various parts of this apparatus as set forth hereinafter.

As shown best in Figures 1, 2 and 6, the front end of the apparatus 10 has a vine cutting means indicated generally at 20 suitably mounted thereon. As shown best in Figure 5, the vine cutting mechanism consists of a stationary cutter bar 22 suitably secured to the frame of the apparatus, upon which is attached a reciprocating sickle knife 24, of conventional design, operable by a connecting rod 26 connected to a crank shaft 28 suitably journalled as at 30 to the side of the apparatus and driven by gearing 32 and 34 from the wheel 16. Thus, as the harvester is drawn by a tractor or the like, the rotation of the wheel 16 causes the actuation of the sickle cutter, thereby mowing pea vines or other crops.

As shown best in Figures 2 and 6, a vine gathering device indicated generally at 36, is supported upon brackets 38 at the front of the apparatus, in an inclined position, and in a manner to overlie and extend forwardly of the cutter 20.

As shown more clearly in Figure 1, the vine gathering device comprises a pair of axles 40 and 42, disposed parallel to each other and secured to the supports 38. A pair of rollers 44 and 46 respectively are carried by these axles, and an endless belt 48 is entrained thereover, this belt being provided with a plurality of outwardly extending spikes or teeth 50. As shown more clearly in Figures 2 and 3, the axle 40 extends outwardly from the side of the casing 12, and is provided with a pulley or other driving means 52, which is operated by a belt or the like 54 which extends within a housing 56 containing operating means therefor to be later set forth.

As will be seen by reference to Figures 3 and 4, the hub of the driving wheel 16 is provided with a pair of gears 58 and 60 which power a pair of driving chains 62 and 64 respectively. As shown in Figure 2, the chain 62 drives the shaft 66 journalled in the housing 56, and by means of suitable pulleys, a belt 68 drives a pair of shafts 70 and 72 respectively in the housing 56, the latter shaft being drivingly connected to the belt 54 as above mentioned.

It will thus be seen that upon rotation of the drive wheel 16, the vine gathering device 36 is caused to operate, the driving mechanism thereof being concealed and protected by the enclosing housing 56.

As shown in Figure 1, the front end of the casing 12 of the apparatus is provided with an opening 74, and a vine elevating mechanism indicated generally at 76 is supported upon the casing, in a downwardly inclined position, with its lower end extending through the opening 74, in a position immediately back of the cutter 20 and below the vine gatherer 36. Upper and lower axles 72 and 80 are journalled in any suitable manner in the casing 12, in parallel relation to each other, and are provided with rollers over which is entrained an endless elevator belt 82 of any suitable construction, and provided with lateral guide surfaces 84 by means of which the vine gathered by the vine gatherer 36 are delivered to the elevator belt 82, or lifted thereby between the guides 84 and discharged from the upper end thereof onto a sorting device indicated generally at 86.

The sorting device consists of a pair of axles 78 and 88, over which is entrained an endless conveyor 90 having suitable cleats or material conveying means 92 extending transversely of the surface thereof. The pair of axles 94 and 96 carry guide rollers which serve to tension the endless conveyor 90 and position the same in a desired path of travel, while a plurality of suitable resilient fingers 98 are mounted within the confines of the endless conveyor, supported in any suitable manner from the casing 12, and resiliently bear against the undersurface of the upper flight of the conveyor to provide a vibrating means for the same as the conveyor is rotated. The function of this construction is to shake and vibrate the conveyor, whereby the vines and crops delivered thereto and transported thereby are shaken into a uniformly thin layer over the surface of the conveyor. This vibration and agitation further serves to detach peas or pods of peas from the vines during the travel over the sorting device.

To further assist in separating the pods or hulls from the vines, there is provided an agitating device, indicated generally at 100 in Figure 1 and consisting, as shown in Figures 1, 3 and 4, of a pair of parallel, transversely disposed crank shafts 102 and 104. Each crank shaft is provided with a plurality of crank throws 106, and connecting rods 108 are journalled between aligned throws in the crank shafts 102 and 104. Spikes, fingers or teeth of any suitable construction begin from the connecting rods 108, into close proximity with the upper flight of the endless sorting conveyor belt 90, whereby these spikes 110 cause a raking or sweeping motion to break up, agitate and stir the material carried by the sorting device, to further assist in separating the peas, shells or pods from the vines.

From the discharge end of the sorting device, the mixed vines, shells and pods, together with loose peas, are delivered to a shelling device designated generally at 112, comprising a pair of parallel transversely disposed axles 114 and 116 carrying pressure rolls 118 and 120 respectively. The rolls are slightly spaced from each other, whereby the material delivered by the sorting device may be passed between the revolving rolls. The vines and pods are crushed and passed through the rolls, the peas being squeezed out of the pods and thrown backwardly into the apparatus where the peas fall upon a collecting device generally designated at 122.

The waste materials pass through the shelling device 112, is discharged upon a waste discharging mechanism 124 from whence it is delivered through an aperture 126 to the outside of the casing 12 of the apparatus, for disposal in any suitable manner. The waste discharging device comprises a pair of parallel shafts 128 and 130, having suitable rollers over which is entrained an endless conveyor belt 132, for removing the waste products from the interior of the casing.

An air blower 134 is mounted in the casing below the waste discharge conveyor belt 132, and is provided with a pump 136 including a rotor shaft 138, for delivering a blast of air from the interior of the casing toward the conveyor belt. This device is intended to hurl by means of the air blast, any waste material dropping below the sorting beds, shelling device 112 and collecting device 122 towards the discharge conveyor belt for delivery outside the casing.

The collecting device 122 includes an endless belt conveyor 142 entrained over a pair of axles having rollers, one of these axles being indicated at 140. The collecting conveyor belt is inclined downwardly from the axle 140, but the upper flight rotates in an upward direction, tending to lift material dropped or deposited thereon, as from the sorting device 86, or material discharged thereon from the shelling device 112 or escaping from between these two devices. The incline is such and the speed of rotation of the conveyor is such that the shelled peas may run by gravity down the conveyor 142 for collection and storing in a manner to be subsequently set forth, while the foliage, vines or other material deposited upon the conveyor are carried upwardly, and discharged into the air blast from the blower 134, from whence they are blown upwardly in the casing and dropped upon the discharge conveyor 124 for the waste products.

As shown in Figures 1 and 4, the peas or other shelled produce delivered by the collecting conveyor 142, are elevated by the delivering conveyor 144, and discharged into a receptacle 146 carried upon the outside of the apparatus as upon a suitable platform or support 148.

As shown in Figures 1 and 4, the device 144 comprises a pair of axles 150 and 152, suitably journalled in the framework of the apparatus, these axles being provided with a pair of rollers over which is entrained an endless conveyor belt 154. The axle 150 as shown in Figure 1, is connected to a driving shaft 156 suitably driven from the power wheel 16 in any suitable manner, through the agency of the universal joint coupling 158.

All of the instrumentalities of the harvester are driven from the power wheel 16 thereof, as shown in Figure 2, it being noted that the axles and shafts 102 and 116 are driven by the endless chain 64, the axles 128 and 140 are driven by a belt or the like suitably driven from one of the shafts above described.

From the foregoing, it is believed that the operation of the device will now be readily understood. During its forward travel, the cutter 20 is operated to mow the vines or crops, while the gathering device 36 rakes and picks up the same and delivers the vines or crops to the elevating conveyor 76. From the latter, the produce is discharged upon the sorting device 86, and shaken and agitated by this device in conjunction with the mechanism 100. During this treatment, some of the pods or hulls were broken open and the peas discharged and dropped downwardly to the collecting conveyor 122. The rest of the material, an evenly dispersed and agitated layer is fed into the shelling device 112, where the peas are extracted from the hulls and discharged downwardly upon the collecting conveyor, while the residue consisting of vines and hulls passes through the rollers and is delivered to the waste discharge conveyor 124. As above mentioned, the blast of air from the blower 134 assists in eliminating the waste products. The liberated peas pass downwardly of the upwardly rotating inclined conveyor belt 142, and are delivered to the elevating and discharge conveyor 144. Any waste produce dropping upon the collecting conveyor are delivered upwardly into the air blast and eliminated as above described.

Since various modifications will readily occur to those skilled in the art after a consideration of the foregoing specification and accompanying drawings, it is not desired to limit the invention to the exact construction shown and described but all suitable modifications and equivalents may be resorted to falling within the scope of the appended claims.

Having described the invention what is claimed as new is:

1. In a harvester including a wheeled frame having forward and rear portions, a vine cutter at the forward portion of said frame, a gathering device disposed above the cutter and including an endless belt and spikes protruding from the outer surface of said belt, said belt overlying and extending forwardly of said cutter, an elevating conveyor having a portion underlying said gathering device, a sorting conveyor adapted to receive material from said elevating conveyor, means for agitating said sorting conveyor, means for vibrating and agitating material on said sorting conveyor, a pair of juxtaposed rolls for receiving vines and hulls therebetween from said sorting conveyor, a waste discharge mechanism receiving material passing through said rolls, and a collecting means for receiving peas from said rolls.

2. The combination of claim 1, wherein said first mentioned means includes a plurality of resilient fingers yieldingly bearing against the upper flight of said sorting conveyor.

3. The combination of claim 1, wherein said means for vibrating and agitating material on said sorting conveyor includes a pair of parallel crankshafts mounted above and disposed transversely of said sorting conveyor, a plurality of cranks on each crankshaft, connecting rods terminally journaled on a crank on each crankshaft, and a plurality of laterally projecting spikes depending from said rods.

4. In a harvester including an endless sorting conveyor; means for agitating material on said conveyor comprising a pair of parallel crankshafts mounted above and disposed transversely of said sorting conveyor, a plurality of resilient fingers yieldingly bearing against said conveyor, a plurality of cranks on each crankshaft, connecting rods terminally journaled on a crank on each crankshaft, and a plurality of laterally projecting spikes depending from said rods.

CHALMER B. GOUGH.
WOODROW W. GOUGH.

REFERENCES CITED

The following references are of record in the file of this patent:

UNITED STATES PATENTS

| Number | Name | Date |
| --- | --- | --- |
| 317,666 | Nicholes | May 12, 1885 |
| 740,949 | Traeger | Oct. 6, 1903 |
| 747,507 | Thach | Dec. 22, 1903 |
| 815,711 | Johnson | Mar. 20, 1906 |
| 856,929 | Tharp et al. | June 11, 1907 |
| 1,598,234 | Baldwin | Aug. 31, 1926 |
| 1,914,839 | Thoen | June 20, 1933 |
| 2,037,300 | Arbuckle | Apr. 14, 1936 |